United States Patent
Bansemir et al.

[19]

[11] Patent Number: 6,009,986
[45] Date of Patent: Jan. 4, 2000

[54] MASS DAMPER

[75] Inventors: Horst Bansemir, Munich; Bernd Bongers, Kirchheim, both of Germany

[73] Assignee: Eurocopter Deutschland GmbH, Donauwoerth, Germany

[21] Appl. No.: 08/948,399

[22] Filed: Oct. 10, 1997

[30] Foreign Application Priority Data

Oct. 10, 1996 [DE] Germany .............................. 196 41 763

[51] Int. Cl.[7] ........................................................ F16F 7/10
[52] U.S. Cl. ............................................................ 188/380
[58] Field of Search ................................... 188/378, 379, 188/380; 267/136, 237, 236

[56] References Cited

U.S. PATENT DOCUMENTS

| | | | |
|---|---|---|---|
| 3,767,181 | 10/1973 | Van Der Burgt et al. | 267/136 |
| 4,494,634 | 1/1985 | Kato | 188/380 |
| 4,744,547 | 5/1988 | Hartel | 188/379 |

FOREIGN PATENT DOCUMENTS

| | | |
|---|---|---|
| 2 036 979 | 2/1972 | Germany . |
| 31 51 983 | 7/1983 | Germany . |

Primary Examiner—Robert J. Oberleitner
Assistant Examiner—Robert A. Siconolfi
Attorney, Agent, or Firm—Evenson McKeown Edwards & Lenahan, PLLC

[57] ABSTRACT

A mass damper for a dynamically excited part including a housing connected in a vibration-free manner with the part and a spring-mass system that can vibrate in the direction of the excitation of the part. The spring-mass system comprises a leaf-spring arrangement tensioned firmly to the housing on one side and provided on the other side at the free spring end with an inertial mass. Resonance adjustment is performed in a structurally simple and problem-free manner, solely by control interventions on the housing side and without mass shifts in the spring-mass system. The inertial mass is permanently connected with the free end of the leaf spring, and, in the vicinity of the tensioning point or at a distance from the point, a variably adjustable leaf-spring support for adjusting the resonant frequency is provided with variable tensioning geometry or internal stiffness.

31 Claims, 3 Drawing Sheets

MASS DAMPER

BACKGROUND AND SUMMARY OF THE INVENTION

This application claims the priority of German patent application number 196 41 763.5, the disclosure of which is expressly incorporated by reference herein.

The invention relates to a mass damper with variable resonant frequency for a dynamically-excited part, and more particularly to a mass damper with a housing connected in a vibration-free manner with the part and with a spring-mass system that can vibrate in the direction of the excitation of the part, said system consisting of a leaf-spring arrangement tensioned at one side integrally with the housing and on the other side provided with an inertial mass at the free end of the spring.

Mass dampers of this type can be used wherever periodic excitation of a part is to be compensated, for example in helicopters to counteract vibration phenomena on helicopter parts, especially cockpit parts, that are dynamically excited by the rotor system of the helicopter at the rotational frequency of the rotor.

Mass dampers with variable resonant frequency are required for modern helicopters that are operated with a variable rotor rpm. For this purpose it is known to displace, on the outer oscillating inertial mass of a leaf-spring mass system, using a positioning drive controlled by an electric motor, differential masses in the lengthwise direction of the leaf-spring arrangement in order thereby to adapt the natural frequency of the mass damper continuously to the exciting frequency of the rotor system. A frequency-adjusting mechanism of this kind in the oscillating part of the spring-mass system however entails a relatively high construction cost and is subject to high acceleration at high load alternation values, so that service life problems can develop.

An object of the invention is to provide a mass damper of the type described generally above that uses a structurally simple and problem-free resonant frequency adjustment in the non-vibrating area of the spring-mass system.

This and other objects have been achieved according to the present invention by providing a mass damper for a vibrating part, comprising: a housing fixedly coupled to the vibrating part which vibrates in an excitation direction; a leaf spring fixedly coupled to said housing at a connection area and having ends extending from said connection area perpendicular to said excitation direction; and a support system operatively coupled to the leaf spring and the housing, said support system being adjustable to vary a biasing force of the leaf spring on the housing in said excitation direction.

This and other objects have also been achieved according to the present invention by providing a mass damper with variable resonant frequency for a dynamically excited part, comprising: a housing connected in a vibration-free manner with the part; a spring-mass system connected to said housing, said system being vibratable in an excitation direction of the part, said system including a leaf-spring arrangement tensioned integrally with the housing and an inertial mass fixedly coupled to a free end of the leaf-spring arrangement; and a support operatively coupled between the leaf-spring arrangement and the housing, said support being adjustable to vary a tension of the leaf-spring arrangement relative to the housing.

This and other objects have also been achieved according to the present invention by providing a method of damping vibrations of a dynamically excited part, comprising: connecting a housing with the part in a vibration-free manner; connecting a spring-mass system to said housing such that said system is vibratable in an excitation direction of the part, said system including a leaf-spring arrangement tensioned integrally with the housing and an inertial mass fixedly coupled to a free end of the leaf-spring arrangement; and operatively coupling a support between the leaf-spring arrangement and the housing such that said support is adjustable to vary a tension of the leaf-spring arrangement relative to the housing.

This and other objects have also been achieved according to the present invention by a method of damping vibrations of a vibrating part, comprising: fixedly coupling a housing to the vibrating part which vibrates in an excitation direction; fixedly coupling a leaf spring to said housing at a connection area such that ends of the leaf spring extend from said connection area perpendicular to said excitation direction; and operatively coupling a support system to the leaf spring and the housing such that said support system is adjustable to vary a biasing force of the leaf spring on the housing in said excitation direction.

According to the invention, as a result of the support acting between the housing and the leaf-spring arrangement with variably adjustable tensioning geometry or spring stiffness, a situation is achieved in which the bending elasticity of the spring arrangement and hence the resonant frequency of the mass damper can be changed solely by an adjusting mechanism located on the housing side and therefore in the non-oscillating area of the spring-mass system, thus eliminating structurally complex and dynamically high-loaded mass displacement drives integrated into the vibrating part of the system.

In another preferred embodiment of the invention, the tensioning geometry of the support is modified such that the leaf-spring arrangement contains at least two individual springs located one above the other and permanently connected together on the side facing the inertial mass, the mutual spacing of said springs at the tensioning point being variably adjustable, via the support, transversely with respect to the extension of the surface of the leaf-spring arrangement. With such support of the double leaf spring with variable spacing, by means of the bending resistance moment, the bending stiffness and hence the resonant frequency of the spring-mass system is influenced in an especially simple fashion structurally by control interventions on the housing side.

According to another preferred embodiment of the invention, which can also be used for mass dampers with a single leaf spring, the effective leaf spring length and hence the resonant frequency is influenced by a variable-length tensioning geometry in such fashion that the support of the leaf spring on the housing side contains two pressure elements, each of which abuts one side of the leaf spring with an adjustable tensioning length, said pressure elements, in a structurally advantageous design, each comprising a tensioning spring that is bent convexly in the direction of the leaf-spring arrangement and is pressed against the leaf-spring arrangement in a contact zone of adjustable length.

In another preferred embodiment of the invention, the flexible support, for reasons of structural simplification, preferably contains mechanical compression springs with a nonlinear spring characteristic and variably adjustable spring pretensioning, with nonmetallic spring elements, for example gas springs with variably adjustable spring hardness, possibly being used as support springs instead of coil springs.

With an eye toward simple design for the adjusting mechanism for changing the tensioning geometry or spring stiffness, the mechanism according to one preferred embodiment comprises an adjusting spindle, rotatably mounted on the housing, and two supporting members, said members, following a change in the pivot point of the spindle, being adjustable in opposite directions with respect to one another and transversely with respect to the extension of the leaf-spring arrangement.

According to further preferred embodiment, the mass damper is preferably provided with a control unit by which the resonant frequency of the mass damper is controlled adaptively to adjust to the changes in the exciting frequency.

Other objects, advantages and novel features of the present invention will become apparent from the following detailed description of the invention when considered in conjunction with the accompanying drawings.

DETAILED DESCRIPTION OF THE DRAWINGS

Figure 1:
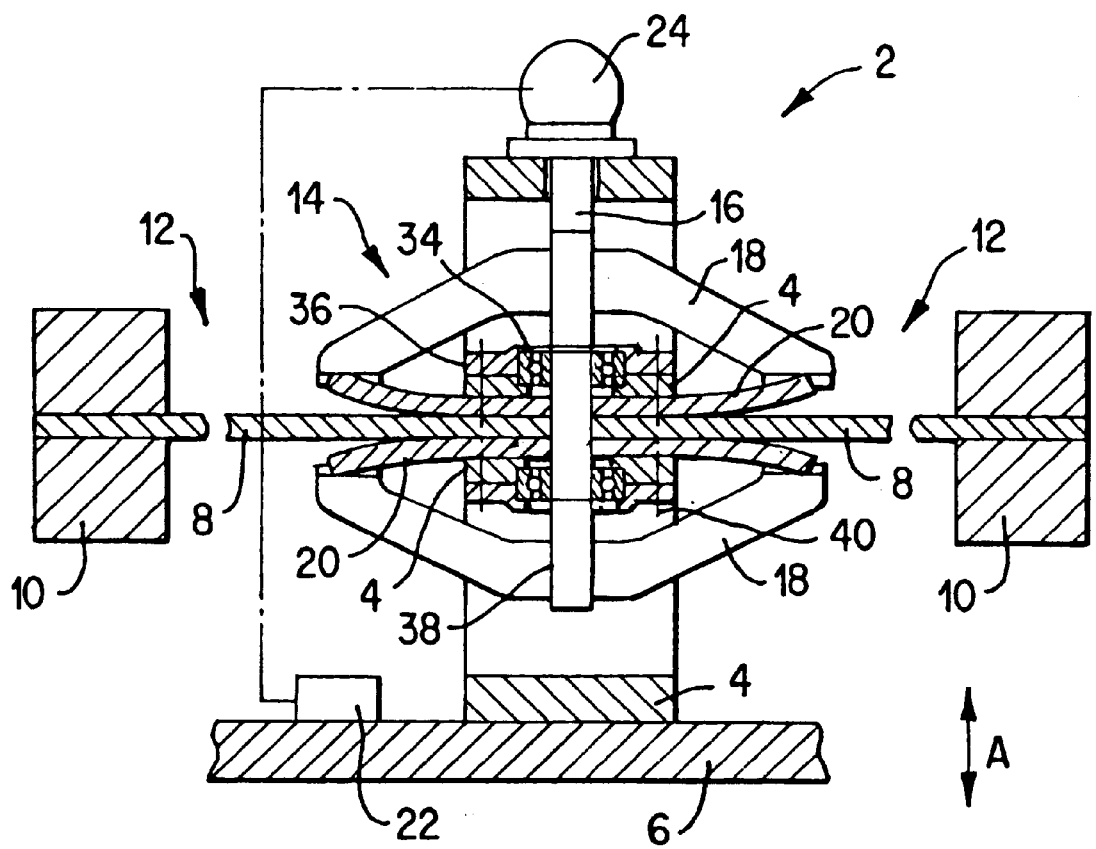
FIG. 1 is a perspective, partially sectional view of a passive mass damper with variable-length leaf-spring tensioning according to a preferred embodiment of the present invention.

According to FIG. 1, a passive mass damper 2 together with its housing 4 is permanently connected to a component 6 that is periodically excited in the direction of arrow A. The component 6 may be, for example, the instrument panel of a helicopter cockpit that is excited and caused to vibrate by the rotor system at the rotational frequency of the rotor. The passive mass damper 2 contains a leaf spring 8 tensioned on housing 4, at each of whose free ends an inertial mass 10 that can oscillate in the direction of arrow A is mounted. The spring-mass system 12 that includes the leaf-spring arm 8 and the inertial mass 10 is caused to vibrate by the exciting forces acting on component 6. In order to damp the exciting forces it is necessary for the resonant frequency of spring-mass system 12 to match the exciting frequency, in other words, for variable-frequency part excitation, for example for helicopters whose rotor systems are operated at variable rotational speeds, the resonant frequency of mass damper 2 must be varied according to the exciting frequency.

For this purpose, leaf spring 8 is tensioned on housing 4 via a support designated by 14 as a whole that has a variably adjustable tensioning geometry. Specifically, support 14 comprises an adjusting spindle 16 rotatably mounted on the housing 4, via bearings 34 and retainers 36, and two supporting members 18. The supporting member 18 are located on opposite sides of the leaf spring and are axially displaceably but nonrotatably guided relative to the housing 4 via opposite adjusting threads 38 located between the supporting member 18 and the adjusting spindle 16. When adjusting spindle 16 is rotated, it causes the two supporting members 18 to move transversely and symmetrically relative to the surfaces of the leaf spring 8, either toward or away from said spring. Leaf spring 8 is tensioned between pressure pieces 20 that are also in the form of leaf springs and are curved convexly in the direction of leaf spring 8. The pressure pieces 20 are connected in a middle area to the leaf spring 8 and the housing 4 via threaded connectors 40, such as bolts or screws. The pressure pieces 20 are mounted displaceably lengthwise on supporting members 18 at their ends. As adjusting spindle 16 is turned, pressure pieces 20 are biased by supporting members 18, depending on the direction of rotation of adjusting spindle 16, either more firmly or less firmly against leaf spring 8. Consequently, the length of the contact and tensioning area between pressure pieces 20 and leaf spring 8 changes, such that the free leaf spring length and accordingly the bending stiffness of leaf spring 8 that is critical for the resonant frequency of the mass damper is reduced or increased accordingly.

For continuous adjustment of the resonant frequency of mass damper 2 to the exciting frequency, a control unit 22 is provided with a sensor that picks up the exciting frequency and with an electric motor 24. The motor rotatably positions adjusting spindle 16 depending on the values of the adjusting signals generated by control unit 22.

Figure 2:
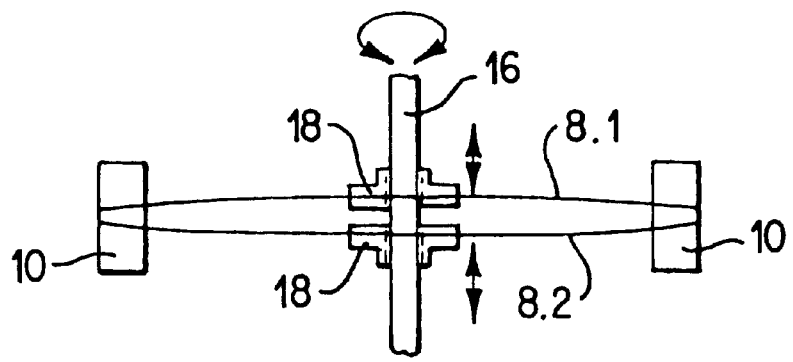
FIG. 2 schematically shows the functional principle of another preferred embodiment with a double leaf spring and leaf tensioning that is variable with respect to the bending resistance moment.
Figure 3:
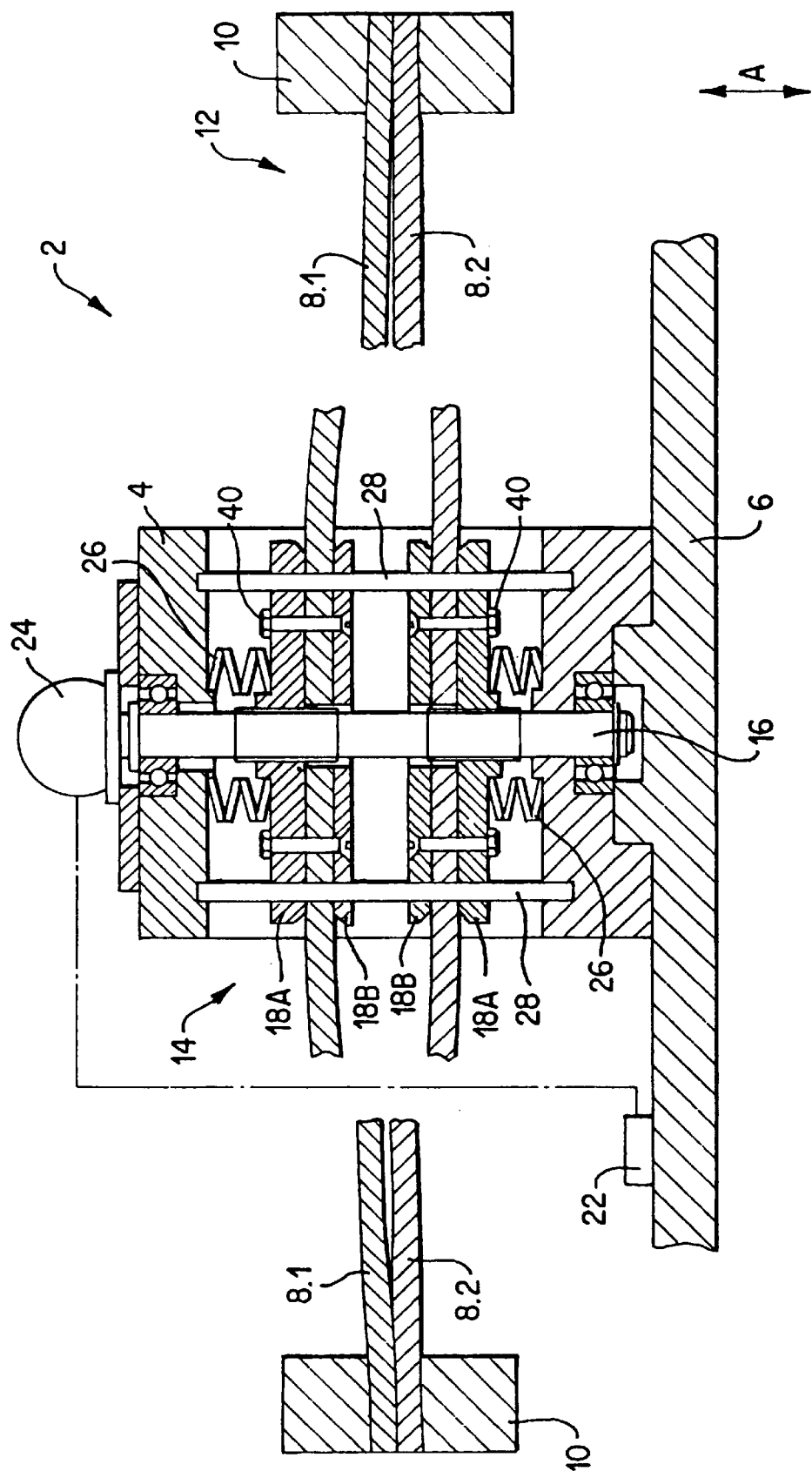
FIG. 3 is a perspective, partially section view of the embodiment according to FIG. 2.

In the mass damper according to FIGS. 2 and 3, in which the parts whose functions correspond to those in FIG. 1 are labelled with the same reference numerals. Leaf spring 8 comprises two individual springs 8.1 and 8.2 located one on top of the other and permanently connected with one another on the side facing inertial mass 10. The mutual spacing of the springs 8.1, 8.2 relative to the tensioning point on the housing is variably adjustable transversely to the extension of the surfaces of leaf springs 8 via an adjustable support 14 that comprises spindle 16 and supporting members 18A, 18B. When the distance of the spring at the tensioning point changes, the bending resistance torque changes and as a result so does the bending stiffness of double leaf spring 8 and accordingly the resonant frequency of spring-mass system 12. As FIG. 3 shows in detail, in this embodiment supporting members are each formed in two pieces from plate-shaped supporting elements 18A, 18B screwed together via threaded connectors 40 with the leaf spring elements 8.1, 8.2, interposed therebetween. The supporting member 18A, 18B are held by cup spring 26 in zero-play threaded contact with the adjusting spindle 16 and are guided axially displaceably but nonrotatably relative to housing 4 via securing pins 28. In addition, the structure and function of mass damper 2 as shown in FIGS. 2 and 3 essentially corresponds to that of the first embodiment.

Figure 4:
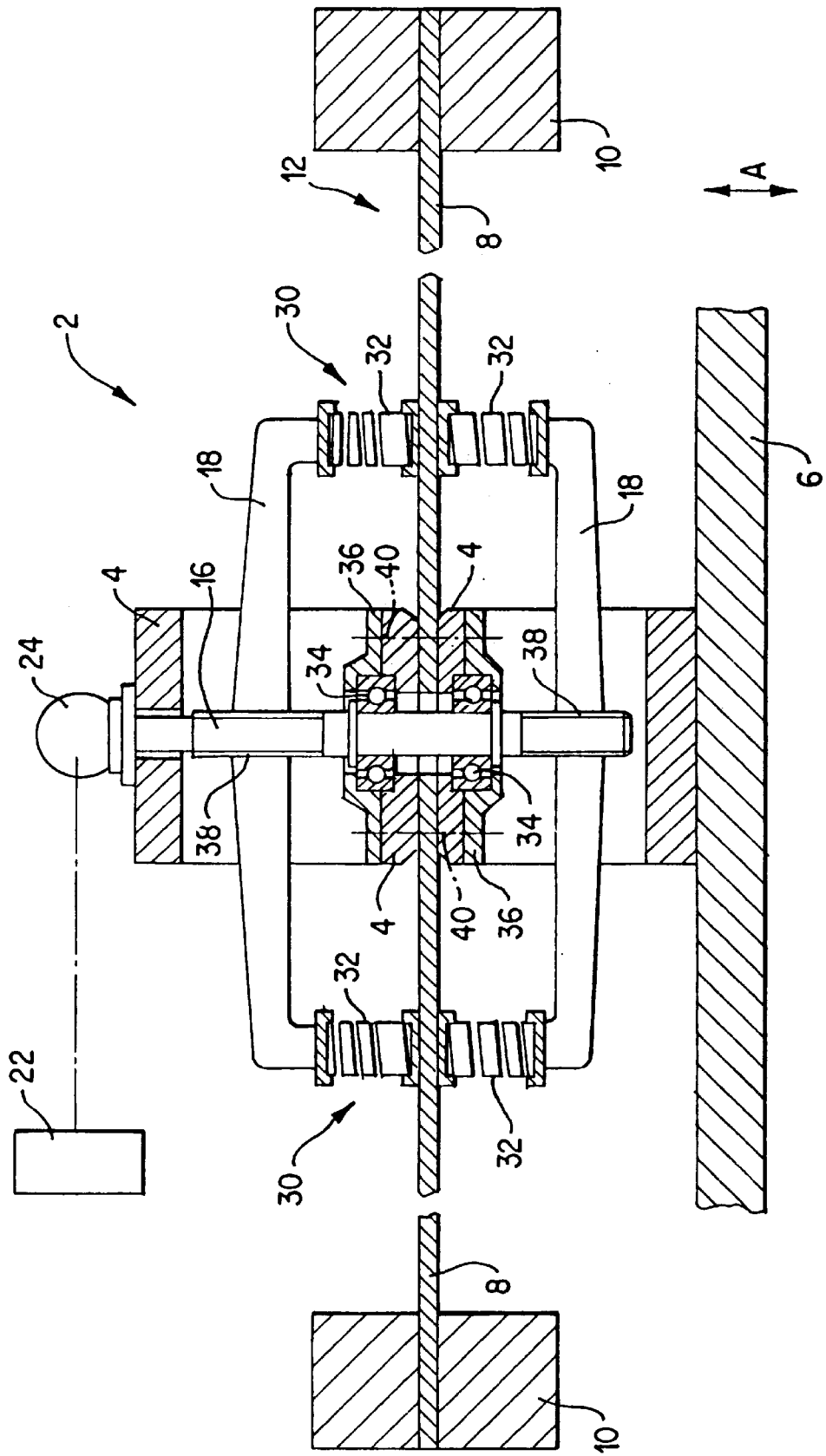
FIG. 4 is a perspective, partially sectional view of a third preferred embodiment of the invention.

In the mass damper according to FIG. 4, in which the parts that have the functions corresponding to the previous drawing figures are labelled with the same reference numerals, leaf spring 8 is tensioned on housing 4 with a fixed tensioning geometry. To adjust the resonance of mass damper 2, a flexible support 30 is provided for each leaf spring arm, in addition to and at a distance from the tensioning point. On each side of leaf spring 8, support 30 has a support spring 32 that acts between the leaf springs and yoke-shaped supporting member 18, said spring 32, as indicated by the changing wall height of the individual turns of the spring, having a nonlinear spring characteristic. If support members 18 are adjusted axially in opposite directions with respect to one another by turning adjusting spindle 16 in the manner described in the above embodiments, the pretensioning of support springs 32 changes and their spring stiffness changes as well. As a result, the stiffness of the entire spring arrangement 8, 32 either increases or decreases and consequently the resonant frequency of mass damper 2 increases or decreases.

For adaptive adjustment of mass damper 2 to the exciting frequency at any given moment, a control unit 22 is also provided with a motor drive 24 for rotational positioning of adjusting spindle 16. In addition, the construction and function of mass damper 2 as shown in FIG. 4 is the same as in the first two embodiments.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A mass damper with variable resonant frequency for a dynamically excited part, comprising:
    a housing connected in a vibration-free manner with the part;
    a spring-mass system connected to said housing, said system being vibratable in an excitation direction of the part, said system including a leaf-spring arrangement tensioned integrally with the housing and an inertial mass fixedly coupled to a free end of the leaf-spring arrangement; and
    a support operatively coupled between the leaf-spring arrangement and the housing, said support being adjustable to vary a bending stiffness of the leaf-spring arrangement while said inertial mass remains a fixed distance from said support.

2. A mass damper according to claim 1, wherein said leaf-spring arrangement comprises at least two individual springs arranged adjacent each other and fixedly coupled with each other at the inertial mass and being adjustably coupled with the support such that the springs are movable relative to each other in said excitation direction proximate a tensioning point between the housing and the leaf-spring arrangement in order to vary said bending stiffness of the leaf-spring arrangement.

3. A mass damper according to claim 2, wherein said support comprises an adjusting spindle mounted rotatably relative to said housing and arranged parallel to said excitation direction and extending to opposite transverse sides of said leaf spring arrangement, and two support members operatively coupled to said adjusting spindle on said opposite transverse sides, respectively, such that a rotation of said spindle moves said support members in said excitation direction symmetrically relative to the leaf-spring arrangement to vary said bending stiffness of the leaf-spring arrangement.

4. A mass damper according to claim 1, wherein said support comprises two adjustable pressure pieces which are adjustably biased against respective opposite sides of the leaf-spring arrangement in said excitation direction.

5. A mass damper according to claim 4, wherein said support comprises an adjusting spindle mounted rotatably relative to said housing and arranged parallel to said excitation direction and extending to opposite transverse sides of said leaf spring arrangement, and two support members operatively coupled to said adjusting spindle on said opposite transverse sides, respectively, such that a rotation of said spindle moves said support members in said excitation direction symmetrically relative to the leaf-spring arrangement to vary said bending stiffness of the leaf-spring arrangement.

6. A mass damper according to claim 5, wherein said pressure pieces are interposed between said support members and said leaf spring arrangement.

7. A mass damper according to claim 4, wherein said pressure pieces are leaf springs, said pressure pieces each having a convex adjustable contact surface which abuts a respective one of said opposite sides of the leaf-spring arrangement, said contact surface being adjustable via said support to vary a length of said contact surface.

8. A mass damper according to claim 7, wherein said support comprises an adjusting spindle mounted rotatably relative to said housing and arranged parallel to said excitation direction and extending to opposite transverse sides of said leaf spring arrangement, and two support members operatively coupled to said adjusting spindle on said opposite transverse sides, respectively, such that a rotation of said spindle moves said support members in said excitation direction symmetrically relative to the leaf-spring arrangement to vary said bending stiffness of the leaf-spring arrangement.

9. A mass damper according to claim 8, wherein said leaf springs are interposed between said support members and said leaf spring arrangement.

10. A mass damper according to claim 1, wherein said support is configured to provide a variably adjustable biasing force in said excitation direction and acting at a distance from a tensioning point between the housing and the leaf-spring arrangement.

11. A mass damper according to claim 10, wherein said support comprises an adjusting spindle mounted rotatably relative to said housing and arranged parallel to said excitation direction and extending to opposite transverse sides of said leaf spring arrangement, and two support members operatively coupled to said adjusting spindle on said opposite transverse sides, respectively, such that a rotation of said spindle moves said support members in said excitation direction symmetrically relative to the leaf-spring arrangement to vary said bending stiffness of the leaf-spring arrangement.

12. A mass damper according to claim 10, wherein said support comprises support springs arranged on opposite sides of the leaf-spring arrangement.

13. A mass damper according to claim 12, wherein said support springs have a nonlinear spring characteristic and a variably adjustable spring pretensioning.

14. A mass damper according to claim 12, wherein said support comprises an adjusting spindle mounted rotatably relative to said housing and arranged parallel to said excitation direction and extending to opposite transverse sides of said leaf spring arrangement, and two support members operatively coupled to said adjusting spindle on said opposite transverse sides, respectively, such that a rotation of said spindle moves said support members in said excitation direction symmetrically relative to the leaf-spring arrangement to vary said bending stiffness of the leaf-spring arrangement.

15. A mass damper according to claim 1, wherein said support comprises an adjusting spindle mounted rotatably relative to said housing and arranged parallel to said excitation direction and extending to opposite transverse sides of said leaf spring arrangement, and two support members operatively coupled to said adjusting spindle on said opposite transverse sides, respectively, such that a rotation of said spindle moves said support members in said excitation direction symmetrically relative to the leaf-spring arrangement to vary said bending stiffness of the leaf-spring arrangement.

16. A mass damper according to claim 1, further comprising a control unit operatively connected to continuously adjust said support as a function of a sensed value of the frequency of the part.

17. A mass damper for a vibrating part, comprising:
    a housing fixedly coupled to the vibrating part which vibrates in an excitation direction;

a leaf spring arrangement fixedly coupled relative to said housing at a connection area and having ends extending from said connection area in a direction perpendicular to said excitation direction; and a support system operatively coupled to the leaf spring arrangement and the housing, said support system being adjustable to vary a biasing force of the leaf spring arrangement on the housing in said excitation direction while said leaf sprint arrangement remains fixed relative to said housing in said perpendicular direction.

18. A mass damper according to claim 17, wherein said support system comprises two adjustable pressure pieces which are adjustably biased against respective opposite sides of the leaf-spring arrangement in said excitation direction, wherein said pressure pieces are leaf springs, said pressure pieces each having a convex adjustable contact surface which abuts a respective one of said opposite sides of the leaf-spring arrangement, said contact surface being adjustable via said support to vary a length of said contact surface.

19. A mass damper according to claim 17, wherein said support comprises an adjusting spindle mounted rotatably relative to said housing and arranged parallel to said excitation direction and extending to opposite transverse sides of said leaf spring arrangement, and two support members operatively coupled to said adjusting spindle on said opposite transverse sides, respectively, such that a rotation of said spindle moves said support members in said excitation direction symmetrically relative to the leaf-spring arrangement to vary said bending stiffness of the leaf-spring arrangement.

20. A method of damping vibrations of a dynamically excited part, comprising:

connecting a housing with the part in a vibration-free manner;

connecting a spring-mass system to said housing such that said system is vibratable in an excitation direction of the part, said system including a leaf-spring arrangement tensioned integrally with the housing and an inertial mass fixedly coupled to a free end of the leaf-spring arrangement; and operatively coupling a support between the leaf-spring arrangement and the housing such that said support is adjustable to vary a bending stiffness of the leaf-spring arrangement while said inertial mass remains a fixed distance from said support.

21. A method according to claim 20, wherein said support system comprises two adjustable pressure pieces which are adjustably biased against respective opposite sides of the leaf-spring arrangement in said excitation direction, wherein said pressure pieces are leaf springs, said pressure pieces each having a convex adjustable contact surface which abuts a respective one of said opposite sides of the leaf-spring arrangement, said contact surface being adjustable via said support to vary a length of said contact surface.

22. A method according to claim 20, wherein said support comprises an adjusting spindle mounted rotatably relative to said housing and arranged parallel to said excitation direction and extending to opposite transverse sides of said leaf spring arrangement, and two support members operatively coupled to said adjusting spindle on said opposite transverse sides, respectively, such that a rotation of said spindle moves said support members in said excitation direction symmetrically relative to the leaf-spring arrangement to vary said bending stiffness of the leaf-spring arrangement.

23. A method of damping vibrations of a vibrating part, comprising:

fixedly coupling a housing to the vibrating part which vibrates in an excitation direction;

fixedly coupling a leaf spring arrangement relative to said housing at a connection area such that ends of the leaf spring arrangement extend from said connection area in a direction perpendicular to said excitation direction; and operatively coupling a support system to the leaf spring arrangement and the housing such that said support system is adjustable to vary a biasing force of the leaf spring arrangement on the housing in said excitation direction while said leaf spring arrangement remains fixed relative to said housing in said perpendicular direction.

24. A method according to claim 23, wherein said support system comprises two adjustable pressure pieces which are adjustably biased against respective opposite sides of the leaf-spring arrangement in said excitation direction, wherein said pressure pieces are leaf springs, said pressure pieces each having a convex adjustable contact surface which abuts a respective one of said opposite sides of the leaf-spring arrangement, said contact surface being adjustable via said support to vary a length of said contact surface.

25. A method according to claim 23, wherein said support comprises an adjusting spindle mounted rotatably relative to said housing and arranged parallel to said excitation direction and extending to opposite transverse sides of said leaf spring arrangement, and two support members operatively coupled to said adjusting spindle on said opposite transverse sides, respectively, such that a rotation of said spindle moves said support members in said excitation direction symmetrically relative to the leaf-spring arrangement to vary said bending stiffness of the leaf-spring arrangement.

26. A mass damper with variable resonant frequency for a dynamically excited part, comprising:

a housing connected in a vibration-free manner with the part;

a spring-mass system connected to said housing, said system being vibratable in an excitation direction of the part, said system including a leaf-spring arrangement tensioned integrally with the housing and an inertial mass fixedly coupled to a free end of the leaf-spring arrangement; and a support operatively coupled between the leaf-spring arrangement and the housing, said support being adjustable to vary a bending stiffness of the leaf-spring arrangement, said support comprises two adjustable pressure pieces which are adjustably biased against respective opposite sides of the leaf-spring arrangement in said excitation direction, wherein said pressure pieces are leaf springs, said pressure pieces each having a convex adjustable contact surface which abuts a respective one of said opposite sides of the leaf-spring arrangement, said contact surface being adjustable via said support to vary a length of said contact surface.

27. A mass damper with variable resonant frequency for a dynamically excited part, comprising:

a housing connected in a vibration-free manner with the part;

a spring-mass system connected to said housing, said system being vibratable in an excitation direction of the part, said system including a leaf-spring arrangement tensioned integrally with the housing and an inertial mass fixedly coupled to a free end of the leaf-spring arrangement; and a support operatively coupled between the leaf-spring arrangement and the housing, said support being adjustable to vary a bending stiffness of the leaf-spring arrangement, wherein said support comprises an adjusting spindle mounted rotatably relative to said housing and arranged parallel to said excitation direction and extending to opposite transverse sides of said leaf spring arrangement, and two support members operatively coupled to said adjusting spindle on said opposite transverse sides, respectively, such that a rotation of said spindle moves said support members in said excitation direction symmetrically relative to the leaf-spring arrangement to vary said bending stiffness of the leaf-spring arrangement.

28. A mass damper with variable resonant frequency for a dynamically excited part, comprising:

a housing connected in a vibration-free manner with the part;

a spring-mass system connected to said housing, said system being vibratable in an excitation direction of the part, said system including a leaf-spring arrangement tensioned integrally with the housing and an inertial mass fixedly coupled to a free end of the leaf-spring arrangement;

means for coupling the leaf-spring arrangement and the housing; and means for adjusting a bending stiffness of the leaf-spring arrangement.

29. A mass damper according to claim 28, wherein said inertial mass remains a fixed distance from said means for adjusting when the bending stiffness of the leaf-spring arrangement is adjusted.

30. A mass damper for a vibrating part, comprising:

a housing fixedly coupled to the vibrating part which vibrates in an excitation direction;

a leaf spring arrangement fixedly coupled relative to said housing at a connection area and having ends extending from said connection area in a direction perpendicular to said excitation direction;

means for coupling the leaf spring arrangement and the housing; and means for adjusting a biasing force of the leaf spring arrangement on the housing in said excitation direction.

31. A mass damper according to claim 30, wherein said leaf spring arrangement remains fixed relative to said housing in said perpendicular direction.

* * * * *